United States Patent

[11] 3,576,069

| [72] | Inventor | Edward Augustus Proctor<br>3417 Clarendon Road, Cleveland Heights, Ohio 44118 |
|---|---|---|
| [21] | Appl. No. | 827,314 |
| [22] | Filed | May 23, 1969 |
| [45] | Patented | Apr. 27, 1971 |

[54] PROCESS FOR FORMING A COMPOSITE BUILDING CONSTRUCTION
9 Claims, 11 Drawing Figs.

[52] U.S. Cl. .................................................. 29/527.1,
52/414, 52/601, 52/741, 264/35, 264/261
[51] Int. Cl. ...................................................... B23p 17/00
[50] Field of Search............................................ 29/527.1;
52/414, 600, 601, 741, (Inquired);
264/(Inquired), 35, 261

[56] References Cited
UNITED STATES PATENTS
2,142,305  1/1939  Davis............................ 52/601X

| 3,239,587 | 3/1966 | Dietziker...................... | 264/261X |
| 3,284,979 | 11/1966 | Edwards........................ | 52/600 |
| 3,316,685 | 5/1967 | Hensel........................... | 52/741 |

*Primary Examiner*—John F. Campbell
*Assistant Examiner*—D. C. Reiley

ABSTRACT: A method of forming a composite building construction in which, an angular flap piece, having a first portion and a second portion separated by a tractable bend line, is partially embedded in a slab. A hardenable fluid material is poured around the first portion and against the second portion so that upon solidifying the fluid material forms the slab in which the first portion is embedded and with which the second portion maintains a contact and subsequently the second portion is peeled away from the slab by bending the flap piece at the bend line so as to fashion a transverse reinforcement for the slab.

PATENTED APR 27 1971
3,576,069
SHEET 1 OF 3
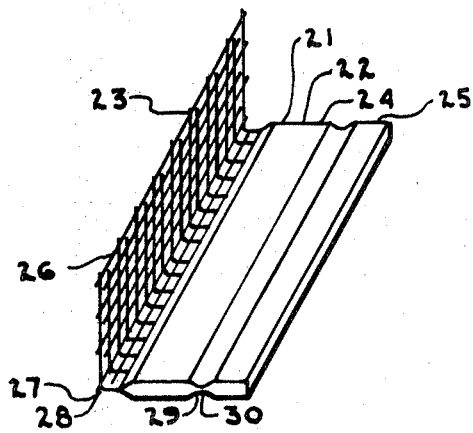
FIG. 1
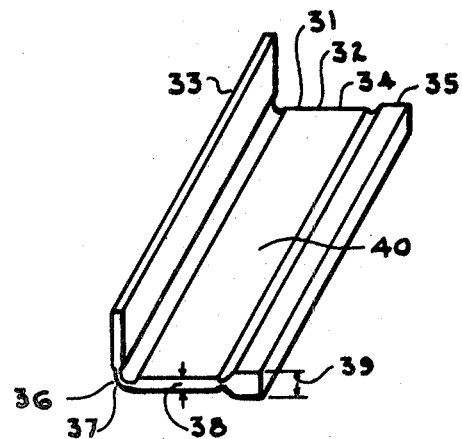
FIG. 2
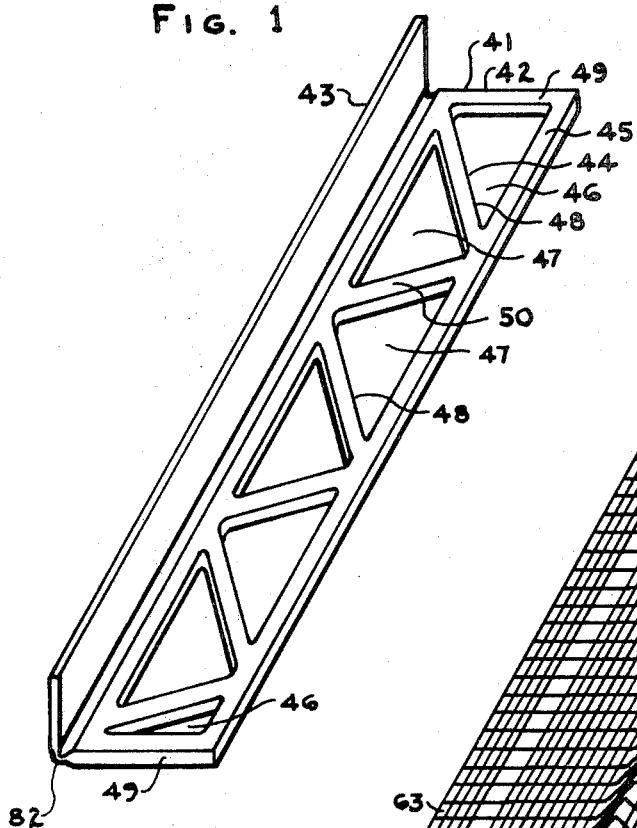
FIG. 3
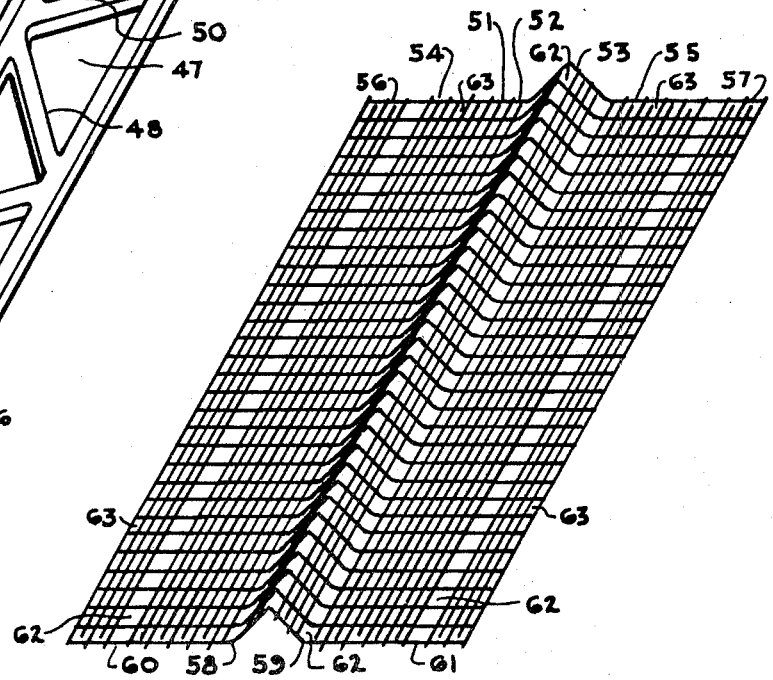
FIG. 10
FIG. 4
Edward Augustus Proctor

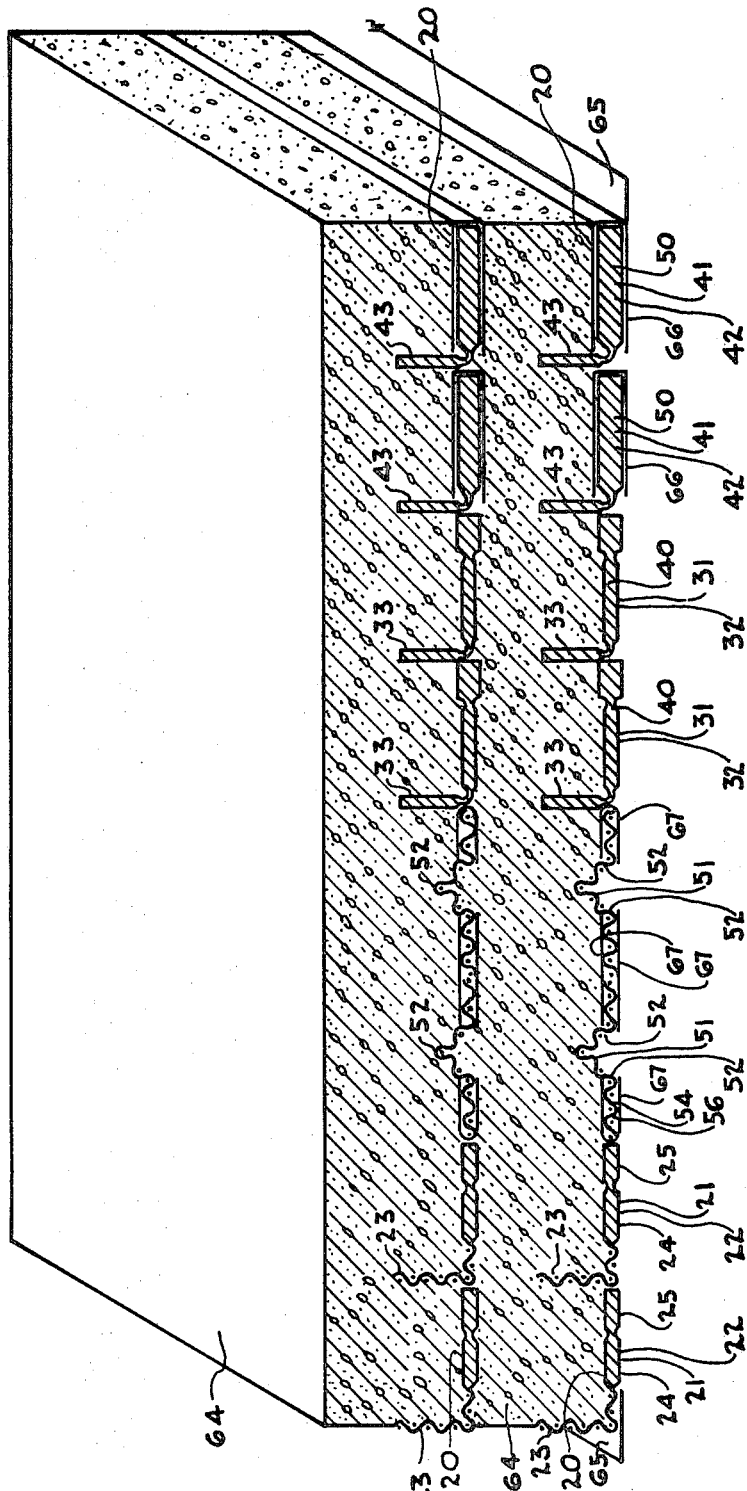

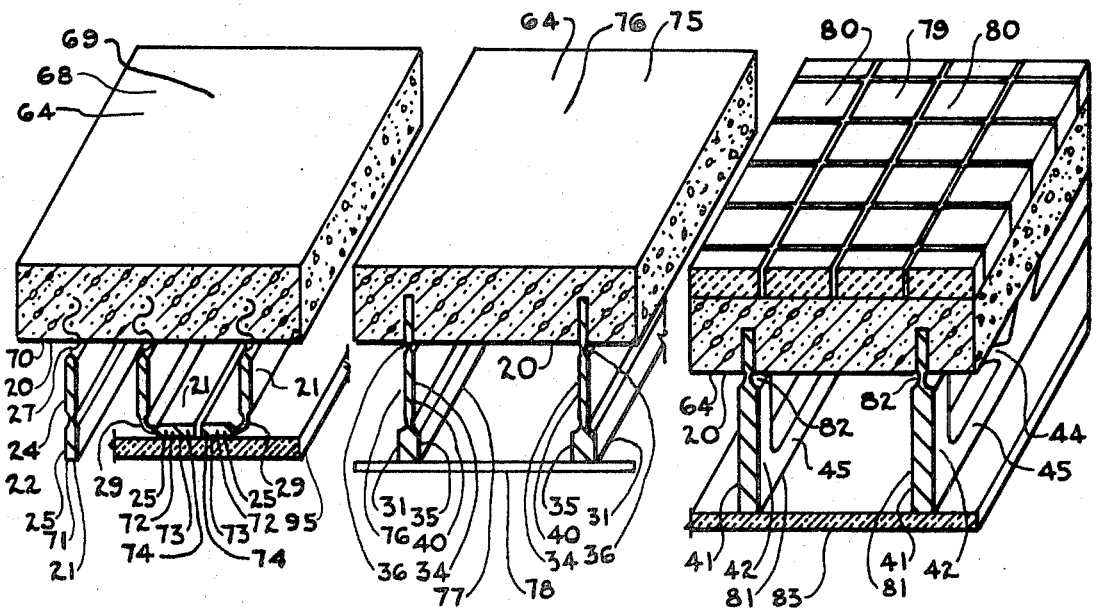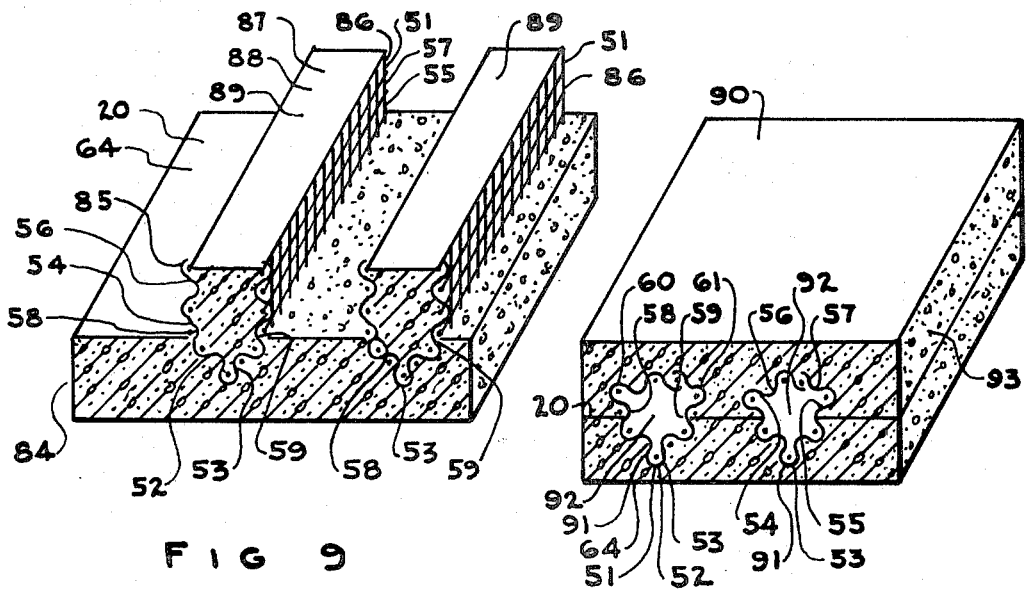

PROCESS FOR FORMING A COMPOSITE BUILDING CONSTRUCTION

In general my invention is for a process for forming a composite building construction. My invention is a process because it consists of consecutive operations or acts. The same consecutive acts performed in the same sequence can be made to produce several variations of composite building constructions. All of the several variations of composite building constructions will have a single primary function of enclosing space. Building constructions as used in this specification is a broad term encompassing such classes of building constructions as floors, roofs, and walls, all of which have a function of enclosing space. The term composite construction as used in this specification is a broad term. The term composite means to be made up of distinct parts or elements generally of a dissimilar nature. A new and special meaning for composite construction has developed in recent years; meaning a construction involving a concrete slab or similar member attached to a dissimilar member such as steel and acting together as a unit. My use of the term composite construction is in a broad sense encompassing the special meaning of composite construction mentioned above together with additional meanings. The additional meaning I would include into composite construction would be a construction where in an initial slab such as concrete has attached thereto an auxiliary member which can be utilized as a form for either confining or excluding additional concrete utilized in changing either the flat configuration of the initial concrete slab or increasing its thickness while providing voids therein.

My invention concerns a process which produces several variations of composite building constructions, all variations being similar in having an initial slab of concrete or similar material. All variations are also similar in that the initial slab has some attached transverse reinforcement. The variations take place primarily within the characteristics of the transverse reinforcement. For example, the transverse reinforcement can be a rib, solid rib, perforated rib, rib of variable thickness, a flanged rib, an open-type lattice frame, a partially shielded rib, a fully encased rib generally of concrete, a tubular rib, a solid flared weblike rib between circular or other-shaped voids.

Although further operations of attaching angles plates, beams, tubes and the like to the transverse ribs will produce further variations in the various building constructions therein presented, such operations will be neglected in this specification. Further amplification of the scope of the basic building constructions therein presented would not amount to invention as a general rule.

My invention utilizes a manufactured first member, having a portion generally a first portion which is embedded within a concrete slab. The manufactured first member has another additional portion or portions generally a second portion which initially serves as a separation form between stacked or adjacent concrete slabs. Upon separation of the slabs, the second portion is stripped or peeled away from the slab and positioned in an initial position transverse to the slab. At the initial position, the second portion can be utilized as a transverse reinforcement for the slab. Further operations such as bending can be performed to the second portion or portions subsequent to it being placed in its initial position as will be described in detail later. Further operations such as pouring or injecting additional concrete can also be performed as desired and as described in detail later.

My invention utilizes a second member of a slab nature already mentioned above. The second member will generally be poured or cast in a plurality of units generally in a horizontal position and in a stacked relationship.

My process for making composite building constructions can be carried out at a manufacturing plant or at a construction site.

The object of my invention is to reduce construction time requirements and construction costs. The most expensive item involved in concrete construction is forming costs. Forming costs I have practically eliminated.

The building constructions produced by my process can be conventional reinforced concrete, prestressed concrete or composite construction as presently known.

A more complete understanding of my invention will follow from a description of the attached drawings wherein like parts are referred to by like reference characters and in which like reference characters refer to like parts; and wherein:

FIG. 1 is an isometric view of a preferred manufactured first member.

FIG. 2 is an isometric view of a first alternate manufactured first member.

FIG. 3 is an isometric view of a second alternate manufactured first member.

FIG. 4 is an isometric view of a third alternate manufactured first member.

FIG. 5 is an isometric view of a plurality of poured-in-place second members of a slab nature and further showing an end view of the preferred and first, second and third alternative versions of the manufactured first member and their relationship to the second members.

FIG. 6 is an isometric view of the second member with an attached preferred manufactured first member serving as a building construction generally classified as a roof construction.

FIG. 7 is an isometric view of the second member with an attached first alternate manufactured first member serving as a building construction generally classified as a floor construction.

FIG. 8 is an isometric view of the second member with an attached second alternate manufactured first member serving as a building construction generally classified as a wall.

FIG. 9 is an isometric view of the second member with an attached third alternate manufactured first member serving as a building construction classified as a wall although it can serve as other building constructions also.

FIG. 10 shows an enlarged view of a detail of the construction of FIG. 1.

FIG. 11 is an isometric view of the second member with an attached third alternate manufactured first member serving as a building construction which can be classified as a roof although it is suitable to serve as other constructions as well.

In FIG. 1 the preferred manufactured first member 21 is an angular flap piece 22 comprising a first portion 23 and second and third portions 24 and 25.

The first portion 23 is in effect an open screen 26 separated from the second portion 24 by a first tractable bend line 27 involving a reduced thickness at 28 as shown on FIG. 10.

The second portion 24 is separated from the third portion 25 by a second tractable bend line 29 indicated by reduced thickness at 30 as shown on FIG. 1.

In FIG. 2 the first alternate manufactured first member 31 is an angular flap piece 32 comprising a first portion 33 and second and third portion 34 and 35 respectively. The first and second portions 33 and 34 are solid plates separated one from another by a first tractable bend line 36 indicated by the reduced first thickness at 37. The second portion 34 has a second thickness 38. The third portion 35 is a solid bar having a third thickness 39 greater than the second thickness 38. The second and third portions 34 and 35 can jointly be considered as a flap element 40 of variable thickness.

In FIG. 3 the second alternate manufactured first member 41 has a first portion 43 and a angular flap piece 42 comprising second and third portions 44 and 45 respectively.

The first portion 43 is a solid plate. The second portion 44 is a perforated portion involving openings 46 and 47 separated by diagonal web members 48 and transverse web member 49. The third portion 45 is in effect a chord member. The combined diagonal web members 48 transverse web members 49 and chord member 45 can jointly be considered as an open lattice frame 50. The flap piece 42 is separated from the first portion 43 by a tractable bend line 82 of reduced sectional area.

In FIG. 4 the third alternate manufactured first member 51 is a twin flap piece 52 comprising first portion 53 between second and third portions 54 and 55 respectively. The second portion 54 is adjacent to a fourth portion 56. The third portion 55 is adjacent to a fifth portion 57.

The first portion 53 is separated from the second portion and from the third portion by first and second tractable bend lines 58 and 59 respectively. The second portion 54 is separated from the fourth portion 56 by a third tractable bend line 60. The third portion 55 is separated from the fifth portion 57 by a fourth tractable bend line 61.

The first member 51 is made from mesh. Part of the first portion 53 and first, second, third and fourth tractable bend lines 58, 59, 60 and 61 is made from a coarse mesh having a wire spacing 62. The second, third, fourth and fifth portions 54, 55, 56 and 57 is made from a finer mesh having a wire spacing 63.

FIG. 5 is an isometric view of a plurality of poured-in-place second members 64 of a slab nature and further showing an end view of the preferred 21 and first 31 second 41 and third 51 alternate versions of the manufactured first members and their relationship to the second members 64.

The second members are poured in a stacked relationship upon a casting bed or surface 65 upon which have been arranged in a side-by-side relationship the angular flap pieces 22, 32, 42 and 52 with the respective first portions 23, 33, 43 and 52 extending upward.

When the fluid concrete is poured upon the manufactured first member 21, 31, 41, and 51 the fluid concrete encases the first portions 23, 33, 43, and 53. Then the fluid concrete solidifies to become slab 64 the first portions 23, 33, 43 and 53 are therein embedded.

The superimposed slab 64 are separated one from another by the second and third portions 24 and 25, flap element 40 lattice frame 50 encased in a fabric envelope 66 and by the second, third, fourth, and fifth portions 54, 55, 56 and 57 respectively wrapped within a sheet 67. The surface 20 is in the bottom surface of the slabs 64 and also the top surface of members 21, 31, 41, and 51 or top surface of a sheet such as 66 and 67 enwrapping one of these members.

FIG. 6 is an isometric view of the second member or slab 64 with an attached preferred manufactured first member 21 previously shown in detail on FIG. 1 and serving as a building construction generally classified as a roof construction 68 having a roof surface 69 and an exposed structural ceiling surface 70.

The second and third portions 24 and 25 have been peeled away from surface 20 and the flap piece 22 has been bent at the first tractable bend line 27 to position the portions 24 and 25 in an initial first position 71.

Subsequently the third portion 25 is bent at the second tractable bend line 29 to produce a flange 72 at a second position 73. The second and third portions 24 and 25 as shown in position 73 can be called a flanged rib 74 where as the same portions as shown in position 71 is still a rib. A ceiling construction 95 can be attached to the flanges 72 and this ceiling construction 95 differs from the exposed structural ceiling 70 previously mentioned above as is evidence by inspection of FIG. 6.

FIG. 7 shows a slablike second member 64 after it has been removed from stack of members 64 shown on FIG. 5.

FIG. 7 is an isometric view of the slablike second member 64 with an attached first alternate manufactured first member 31 previously shown in detail on FIG. 2. The construction of FIG. 7 serves as a building construction generally classified as a floor construction 75 having a floor surface 76.

The second and third portions 34 and 35 of member 31 have been peeled away from the surface 20; this required that the flap element 40 be bent at the first tractable bend line 36. The flap element 40 has been previously described as being of variable thickness. The flap element 40 when peeled away from the surface 20 into a position transverse to surface 20 in which position the flap element 40 becomes a rib of variable thickness 77 reinforcing the slablike second member 64.

The third portion 35 of the first member 31 is the thickest portion of member 31 and can be considered as acting as a bottom flange of a composite construction, wherein the slablike member 64 acts as the top and compression flange. Since the thickest portion 35 must be maintained in an alignment, a bridging rod 78 is welded to the thickest portions 35 at various intervals.

FIG. 8 again shows a slablike second member 64 after it has been removed from the stack of members 64 shown on FIG. 5.

FIG. 8 is an isometric view of a slablike member 64 with an attached second alternate manufactured first member 41 previously shown in detail on FIG. 3. The construction of FIG. 8 serves as a building construction generally classified as an exterior wall. The slablike second member 64 is poured against and is therefor bonded to a panel of bricks 80 arranged in this instance in stack bond relationship. Any of the other similar wall facing materials can be used instead of the bricks 80 is so desired.

The flap piece 42 comprising second and third portions 44 and 45 is peeled away from the surface 20; and the fabric or plastic envelope 66 shown on FIG. 5 is removed and discarded. When the flap piece 42 is peeled away from surface 20 and is positioned transverse to surface 20 the flap piece 42 is then in position 81. When the flap piece 42 is peeled away from surface 20 the second alternate first member 41 is forced to bend at the tractable bend line 82. A plaster or similar type of interior wall facing 83 can be applied against the chord member 45. A bridging rod similar to the rod 78 shown on FIG. 7 can be installed connecting the chord members 45 in order to maintain an alignment of the chord members 45.

FIG. 9 again shows slablike second member 64 after it has been removed from the stack of members 64 shown on FIG. 5.

FIG. 9 is an isometric view of the slablike second member 64 with an attached third alternate manufactured first member 51. The construction of FIG 9 serves as a building construction generally classified as a wall 84.

The third alternate manufactured first member 51 is shown in detail on FIG. 4. The third alternate manufactured first member 51 is a twin flap piece 52 having a first portion 53 which has already been cast within the concrete slablike member 64. The first portion 53 is between second and third portions 54 and 55 as well as between fourth and fifth portions 56 and 57.

The combined second and fourth portions 54–56 are peeled away from surface 20 and bent upward into position 55 transverse to the surface 20; and the sheet 64 shown on FIG. 5 is removed therefrom and discarded.

It can be noted that the surface 2 of FIG. 9 is an upper surface while the similar surface 20 of FIGS. 6, 7 and 8 is a bottom surface. The slablike members 64 as shown in FIG. 5 would remain in the same relationship for FIGS. 5, 6, 7 and 8; while the slablike members 64 of FIGS. 9 and 11 have been inverted to bring the surface 20 on top.

The combined third and fifth portions 55–57 are peeled away from surface 20 and bent upward into position 86 transverse the surface 20. The sheet 67 shown in FIG. 5 is removed from the combined portions 55–57 and discarded.

While the combined portions 54–56 and 55–57 is bent upward into positions 85 and 86. The bending is made to take place at the first and second tractable bend lines 58 and 59 respectively.

The combined portions 54–56 and 55–51 fashion the sides of a troughlike structure 87 which is subsequently filled with fluid concrete 88. When this fluid concrete gains its usual set the concrete slablike member 64 becomes an actual ribbed slab having integral ribs 89 at various intervals.

FIG. 11 again shows a slablike second member 64 after it has been removed from the stack of members 64 shown on FIG. 5.

FIG. 11 is an isometric view of the slablike second member 64 with an attached third alternate manufactured first member 51. The construction of FIG. 1 serves as a building construction generally classified as roof 90.

The third 51 alternate manufactured first member previously shown in FIG 9 is shown in detail in FIG. 4.

The third alternate manufactured first member 51 is a twin flap piece 52 having a first portion 53 which is already been cast within the concrete slablike member 64. The first portion 53 is between second and third portions 54 and 55 and are separated therefrom by first and second tractable bend lines 58 and 59 respectively. The second portion 54 is adjacent to a fourth portion 56 and is separated therefrom by a third tractable bend line 60. The third portion 55 is adjacent to a fifth portion 57 and is separated therefrom by a fourth tractable bend line 61.

The second, third, fourth and fifth portions 54, 55, 56 and 57 are bent at the tractable bend lines 58, 59, 60 and 61 fashioning a tubular structure 91 surrounding a void 92. The tubular structure 91 is cast within a thick concrete topping 93 surrounding the voids 92 thus fashioning an integral cored concrete slab structure 94.

I claim:

1. A process for forming a composite building construction involving a slab and a partially embedded angular flap piece having an embedded first portion adjacent to an unconfined second portion subsequently peeled away from the slab into a position perpendicular to the slab, said process comprising pouring a fluid material against the second portion and around the first portion, the fluid material upon solidifying becomes the slab, embedding the first portion while maintaining a contact with the second portion which acts as a flap, between the first portion and the flap is a tractable bend line, subsequent peeling of the flap away from the slab bends the flap piece at the bend line to position the flap perpendicular to the slab thereby fashioning a transverse reinforcement for the slab.

2. A process for forming a composite building construction involving a slab having bedded ceramic blocks and a partially embedded angular flap piece having an embedded first portion adjacent to an unconfined second portion subsequently peeled away from the slab into a position perpendicular to the slab, said process comprising pouring a fluid material against the second portion and around the first portion and around at least a part of the ceramic blocks, the fluid material upon solidifying becomes the slab embedding the first portion and bedding the ceramic blocks while maintaining a contact with the second portion which acts as a flap, between the first portion and the flap is a tractable bend line, subsequent peeling away of the flap from the slab bends the flap piece at the bend line to position the flap perpendicular to the slab thus fashioning a transverse rib reinforcing the slab.

3. A process for forming a composite building construction involving a slab and a partially embedded angular flap piece having an embedded first portion adjacent to unconfined second and third adjacent portions subsequently peeled away from the slab into a position perpendicular to the slab, said process comprising pouring a fluid material against the second and third portions and around the first portion, the fluid material upon solidifying becomes the slab embedding the first portion while maintaining a contact with the second and third portions, the fluid material upon solidifying embeds the first portion while maintaining a contact with the second and third portions which portions jointly act as a flap, between the first portion and the flap is a tractable bend line, subsequent peeling away of the flap from the slab bends the flap piece at the bend line to position the flap perpendicular to the slab, the third portion is thicker than the second portion giving the flap a variable thickness, the flap in its perpendicular position fashions a transverse rib of variable thickness reinforcing the slab.

4. A process for forming a composite building construction involving a slab and a partially embedded angular flap piece having an embedded first portion adjacent to unconfined second and third adjacent portions subsequently peeled away from the slab into a position perpendicular to the slab, said process comprising pouring a fluid material against the second and third portions and around the first portion, the fluid material upon solidifying becomes the slab embedding the first portion while maintaining a contact with the second and third portions which portions jointly act as a flap, between the first portion and the flap is a tractable first bend line, subsequent peeling away of the flap from the slab bends the flap piece at the first bend line to position the flap perpendicular to the slab to fashion a rib between the second and third portions is a second tractable bend line, subsequently bending the third portion at the second bend line positions the third portion parallel to the slab, whereas the third portion becomes an angular flange for the rib.

5. A process for forming a composite building construction involving a slab and a partially embedded angular flap piece having an embedded first portion adjacent to an unconfined second portion subsequently peeled away from the slab into a position perpendicular to the slab, said process comprising pouring a fluid material against a sheet covering the second portion while pouring the fluid material around the first portion, the fluid material upon solidifying becomes the slab embedding the first portion while maintaining a contact with the sheet covering the second portion, the second portion acts as flap, between the first portion and the flap is a tractable bend line, subsequent peeling the flap away from the sheet and slab by bending the flap piece at the bend line to position the flap perpendicular to the slab to fashion a rib, the second portion is a lattice frame which makes the rib a lattice framed rib.

6. A process for forming a composite building construction involving a slab and a partially embedded angular flap piece having an embedded first portion between unconfined second and third portions subsequently peeled away from the slab into parallel positions perpendicular to the slab, said process comprising pouring a first fluid material against the second and third portions and around the first portion, the first fluid material upon solidifying becomes the slab embedding the first portion while maintaining a contact with the second and third portions which portions act respectively as first and second flaps, between the first portion and the first flap is a tractable first bend line, between the first portion and the second flap is a tractable second bend line, subsequent peeling of the first and second flaps away from the slab bends the flap piece at the first and second bend lines to position the first and second flaps in parallel positions perpendicular to the slab to fashion parallel trough sides which together with the slab subsequently confines a second fluid material which upon solidifying becomes a solid rib transverse to the slab.

7. A process for forming a composite building construction involving a slab and a partially embedded angular flap piece having an embedded first part between unconfined second and third parts subsequently peeled away from the slab into a position transverse to the slab, said process comprising pouring a fluid material against the second and third parts and around the first part, the fluid material upon solidifying becomes the slab embedding the first part while maintaining a contact with the second and third parts which parts respectively act as first and second flaps, between the first part and first flap is a first tractable bend line, and between the first part and second flap is a second tractable bend line, subsequent peeling away the first and second flaps from the slab bends the flap piece at the first and second bend lines to position the flaps perpendicular to the slab, the second part comprises adjacent first and second portions separated by a third tractable bend line, the third part comprises adjacent third and fourth portions separated by a fourth tractable bend line, the second and fourth portions having longitudinal edges, bending the second and fourth portions toward one another bends the flap pieces at the third and fourth bend lines to position the second and fourth portions parallel to the slab with their longitudinal edges making a juncture thereby fashioning a rectangular tube transversely attached to the slab.

8. A process for forming a composite building construction involving a solid first slab and a partially embedded angular flap piece having an embedded first portion adjacent to an unconfined second portion subsequently peeled away from the slab into an initial first position perpendicular to the first slab, said process comprising pouring a first fluid material against the second portion and around the first portion, the first fluid material upon solidifying becomes the first slab embedding the first portion while maintaining a contact with the second portion which acts as a flap, between the first and second portions is tractable bend line, subsequent peeling the flap away from the first slab bends the flap piece at the bend line to position the flap at the initial first position perpendicular to the slab, subsequent curling of the flap around to meet itself at the juncture fashions a tubular rib transverse to the first slab having a first slab thickness, a second fluid material poured over the first slab and around the tubular ribs bonds to the firs slab and subsequently solidifies to become in conjunction with the first slab an integral cored second slab having voids at the tubular ribs and a second slab thickness greater than the first thickness.

9. A process for forming a composite construction involving a solid slab and a partially embedded angular flap piece having an embedded first portion adjacent to unconfined second, third, and fourth parallel portions subsequently peeled away from the slab into an initial position perpendicular to the slab, said process comprising pouring a first fluid material against the second, third and fourth portions and around the first portion, the first fluid material upon solidifying becomes the slab embedding the first portion while maintaining a contact with the second, third and fourth portions, which second, third and fourth portions act as a flap, the fourth portion has an edge, between each portion is a tractable bend line, subsequent peeling the flap away from the slab bends the flap at a bend line to position the flap at the initial first position perpendicular to the slab, subsequent bending the flap at the other bend lines reshapes the flap by arranging the second, third and fourth portions into a rectangular tube with the edge of the fourth portion making a juncture with the slab, a second fluid material injected into the tube upon solidifying becomes an encased rib transverse to the slab.